United States Patent
Gao (10) Patent No.: US 9,891,606 B2
(45) Date of Patent: Feb. 13, 2018

(54) METHOD AND SYSTEM FOR TRANSMITTING POSITION SWITCH STATUS SIGNAL

(71) Applicant: GRG Banking Equipment Co., Ltd., Guangzhou, Guangdong (CN)

(72) Inventor: Ping Gao, Guangdong (CN)

(73) Assignee: GRG Banking Equipment Co,. Ltd., Guangzhou, Guangdong (CN)

( * ) Notice: Subject to any disclaimer, the term of this patent is extended or adjusted under 35 U.S.C. 154(b) by 302 days.

(21) Appl. No.: 14/767,660

(22) PCT Filed: Jul. 2, 2013

(86) PCT No.: PCT/CN2013/078657
§ 371 (c)(1),
(2) Date: Aug. 13, 2015

(87) PCT Pub. No.: WO2014/134891
PCT Pub. Date: Sep. 12, 2014

(65) Prior Publication Data
US 2016/0004234 A1 Jan. 7, 2016

(30) Foreign Application Priority Data
Mar. 5, 2013 (CN) .......................... 2013 1 0069885

(51) Int. Cl.
*G05B 15/02* (2006.01)
*G06F 17/11* (2006.01)
*G05B 19/042* (2006.01)

(52) U.S. Cl.
CPC ......... *G05B 15/02* (2013.01); *G05B 19/0423* (2013.01); *G06F 17/11* (2013.01); *G05B 2219/25435* (2013.01)

(58) Field of Classification Search
CPC ................ G05B 15/02; G05B 19/0423; G05B 2219/25435; G06F 17/11
See application file for complete search history.

(56) References Cited

U.S. PATENT DOCUMENTS

| | | | | |
|---|---|---|---|---|
| 8,874,814 B2 * | 10/2014 | Coffey | ................... | H03M 11/24 710/15 |
| 2004/0227725 A1 * | 11/2004 | Calarco | .................. | G05G 9/047 345/156 |

(Continued)

FOREIGN PATENT DOCUMENTS

| CN | 201126467 Y | 10/2008 |
|---|---|---|
| CN | 103176461 A | 6/2013 |

(Continued)

OTHER PUBLICATIONS

International Search Report from corresponding International Application No. PCT/CN2013/078657 dated Dec. 12, 2013.

(Continued)

*Primary Examiner* — Mabdelmonie Elamin
(74) *Attorney, Agent, or Firm* — Wolf, Greenfield & Sacks, P.C.

(57) ABSTRACT

A system for transmitting a position switch status signal, comprises a signal output unit, a first converting apparatus, a second converting apparatus, and a control unit. Status signals of position switches are outputted by the signal output unit, parallel status signals are converted into parallel first current signals by using the first converting apparatus, currents in the first current signals are summated to obtain a second current signal, and digital status signals of the position switches are restored by using the second converting apparatus and the control unit. Also provided is a method for transmitting a position switch status signal.

11 Claims, 9 Drawing Sheets

(56) References Cited

U.S. PATENT DOCUMENTS

2010/0184323 A1* 7/2010 Patel ................... H01R 13/516
  439/490
2011/0137968 A1* 6/2011 Ing .......................... G06F 3/043
  708/201
2012/0023276 A1 1/2012 Coffey et al.

FOREIGN PATENT DOCUMENTS

EP          0175135  A2   3/1986
JP          09238122 A    9/1997

OTHER PUBLICATIONS

Extended European Search Report, dated Mar. 24, 2016, from corresponding European Application No. 13876937.7.
Wilson et al.: "Direct Method of Contact Identification," (1981) Design Focus; pp. 22.

* cited by examiner

| State numbering | States of position switches | Value range of data output by the analog-to-digital converter |
|---|---|---|
| 1 | 000 | [0~3] |
| 2 | 001 | [4~7] |
| 3 | 010 | [8~11] |
| 4 | 011 | [12~15] |
| 5 | 100 | [16~19] |
| 6 | 101 | [20~23] |
| 7 | 110 | [24~27] |
| 8 | 111 | [28~31] |

Figure 11

Figure 12

METHOD AND SYSTEM FOR TRANSMITTING POSITION SWITCH STATUS SIGNAL

The present application is the national phase of International Application No. PCT/CN2013/078657, titled "METHOD AND SYSTEM FOR TRANSMITTING POSITION SWITCH STATUS SIGNAL", filed on Jul. 2, 2013, which claims priority to Chinese Patent Application No. 201310069885.6, titled "METHOD AND SYSTEM FOR TRANSMITTING STATE SIGNALS OF POSITION SWITCHES", filed on Mar. 5, 2013 with the State Intellectual Property Office of People's Republic of China, each of which applications is incorporated herein by reference to the maximum extent allowable by law.

FIELD

The disclosure relates to the field of embedding, in particular to a method and system for transmitting state signals of position switches.

BACKGROUND

Figure 1:
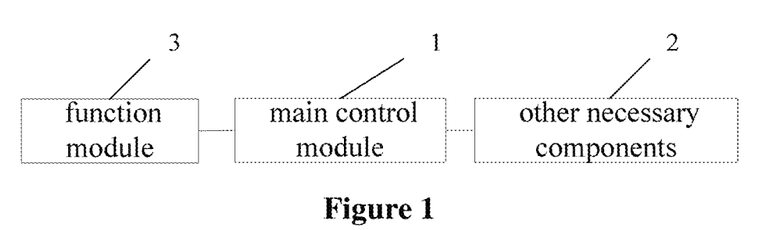
FIG. 1 is a schematic structural diagram of an intelligent machine.

With continuous development of science and technology, intelligent machines are increasingly used. The intelligent machine systems have a similar structure, as shown in FIG. 1, including a main control module 1 configured to implement automatic control on each component of the intelligent machine system; other necessary components 2 including an actuator, complex mechanism, and a man-machine interface, etc.; and a function module 3 including a large number of sensors, such as an image sensor, a distance sensor and a position sensor, etc., distributed at a plurality of regions of the intelligent machine system. The function module is connected to the main control module to facilitate the control module to acquire states and data of the sensors in the function module. To move more flexible, normally, the intelligent machine is required to have a volume as small as possible.

For the numerous sensors of the function module 3, the position sensor is mainly configured to detect whether an object under detection is in position. The position of the object is detected mainly through optical method. The hardware structure for the method mainly includes a first part and a second part, where the first part (A) is a light-emitting end, the second part (B) is a light-sensitive end, light emitted by the light-emitting end A strikes the light-sensitive end B, and the light-sensitive end B converts, according to the light intensity, the light into a voltage signal for output. If a light path between the light-emitting end A and the light-sensitive end B is not obstructed, i.e., the object under detection is not in a predetermined position, the light-sensitive end B output a low-level voltage; and if the light path between the light-emitting end A and the light-sensitive end B is obstructed, i.e., the object under detection is in the predetermined position, the light-sensitive end B outputs a high-level voltage. Hence, the position sensor may also be regarded as a position switch. If the object under detection is not in the predetermined position, the light-sensitive end B outputs the low level voltage; and if the object under detection is in the predetermined position, the light-sensitive end B outputs the high level voltage. Alternatively, the position switch may be a switch with a conductive contact, such as a microswitch.

To implement automatic control, normally a large number of position switches need to be installed inside the function module of the intelligent machine, and the main controller needs to acquire states of these position switches at the same time, to accurately determine whether the object under detection is in position. To enable the main control module to acquire the states of the position switches, wired connections need to be established between the position switches inside the function module and the main control module. It is well known that the more the position switches are, the more the cables between the main control module and the function module are, and the greater the diameter of the cable bundle is. It is assumed that 50 position switches are needed to be installed inside one function module, normally each position switch has three lines (one is a power line, another one is a ground wire, and yet another one is a data line), thus there are totally 150 lines. If all these 150 lines need to be connected to the main control module, the diameter of the cable bundle may be very large. In a machine with a strictly limited volume, the cable bundle with such a large diameter is not allowed.

Two conventional methods are used to reduce number of cables between the function module and the main control module to reduce the diameter of the cable bundle.

Figure 2:
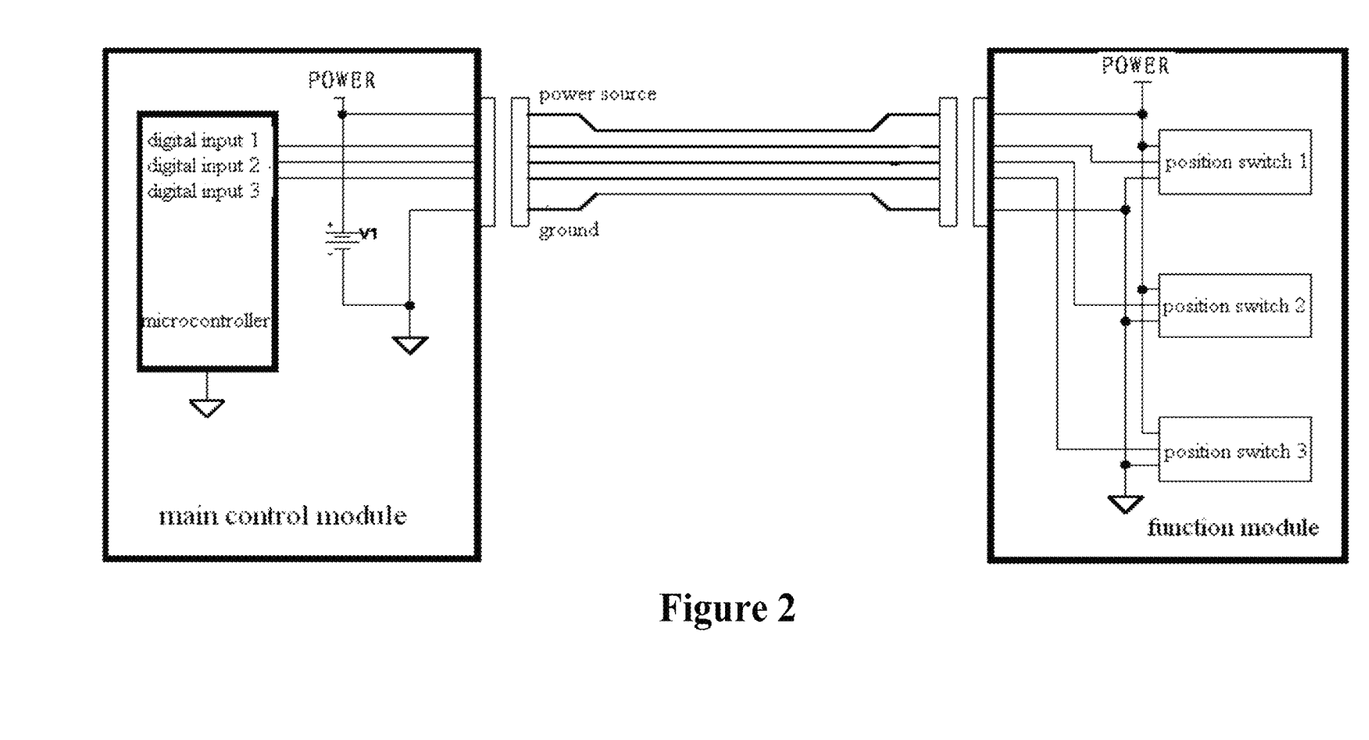
FIG. 2 is a schematic structural diagram of a main control module and a function module in conventional technology.

As shown in FIG. 2, the first method is to, for all position switches inside the function module, uniformly connect power lines together, uniformly connect the ground wires together, and connect the uniformly connected power lines and ground wires to the main control module, i.e., all position switches share a power line and a ground wire, and connect all data lines of respective position switches to the main control module. If number of the position switches is N, with this method, number of cables between the main control module and the function module may be reduced to a minimum of N+2.

However, with this method, if there are a lot of position switches, there are still a lot of cables between the function module and the main control module.

Figure 3:
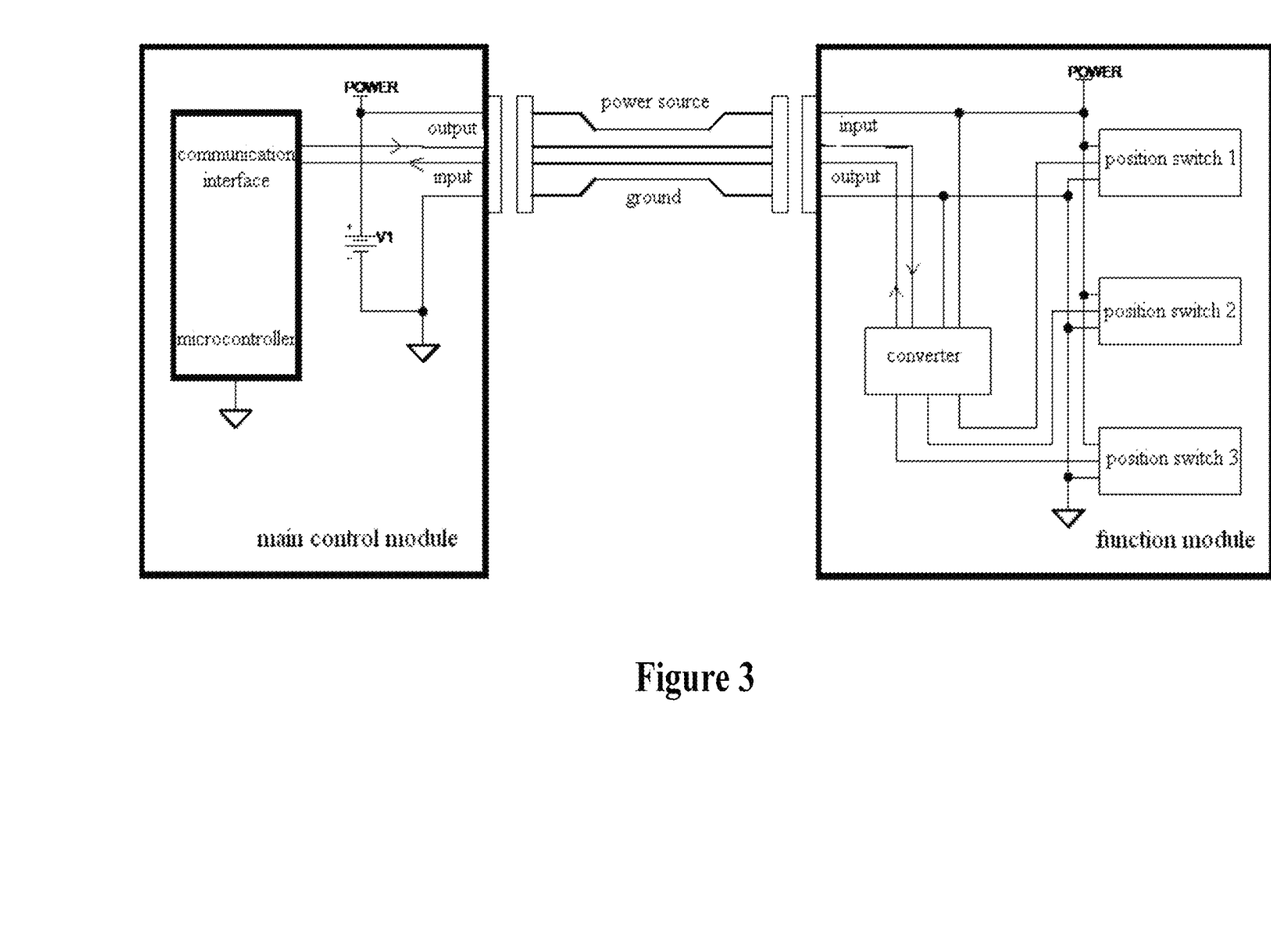
FIG. 3 is another schematic structural diagram of main control module and function module in conventional technology.

As shown in FIG. 3, the second method is to, based on the first method, uniformly connect data lines of all position switches inside the function module to a converter, use the converter to convert the state signals of all position switches into serial data, transmit the serial data to the main control module through one cable, input commands, which are transmitted from the main control module and aimed to the position switches, to the converter through one cable, execute the commands transmitted from the main control module through the converter, convert the state signals of the position switches into serial data, and return the serial data to the main control module. With this method, the state signals for multiple position switches may be sequentially output, and number of the cables may reduce to about 4.

In the second method, since the main control module use a serial reading, it takes more time in one acquisition of an output signal of a position switch, thus real time performance is poor. In addition, in the serial reading method, a digital signal is transmitted, and the digital signal can only carry state information for one position switch at a time. To transmit the states for multiple position switches, the state information for multiple position switches must be transmitted one by one in a chronological order, and to implement function for transmitting one by one in the chronological order, a sequential circuit is necessitated. Hence, a circuit board for implementing serial to parallel and parallel to serial conversion must be embedded in the converter. The circuit board is mainly composed of the sequential circuit which is hard to automatically recover after disturbance, therefore a wrong position signal may be transmitted to the main control module or it needs to take more time to perform fault detection and correction.

Therefore a method, through which number of cables between the main control module and the function module may be reduced while the main control module can quickly and accurately acquire state signals of respective position switches, is badly needed.

SUMMARY

In view of this, a method and system for transmitting state signals of position switches are provided according to embodiments of the disclosure.

To realize above purpose, technical solutions are provided according to the embodiments of the disclosure.

The system for transmitting state signals of position switches includes:

a signal outputting unit configured to output state signals for respective position switches;

a first conversion device, connected to the signal outputting unit, and configured to convert, according to a preset rule, state signals greater than a threshold into first current signals with nonzero current value which have one-to-one correspondence to the state signals greater than the threshold, and output a second current signal acquired by summing currents of the first current signals;

a second conversion device configured to receive the second current signal through a cable, and convert the second current signal into a digital voltage signal; and a control unit configured to receive the digital voltage signal, and restore the digital state signals for respective position switches.

Preferably, the first conversion device includes:

conversion units connected in parallel, the conversion units being connected in one-to-one manner to the position switches numbered N, where N is a natural number, N=1, 2, 3, . . . n, n is a quantity of the position switches;

the conversion unit includes:

a switch unit, connected to a position switch numbered N, and configured to receive and detect the state signal of the position switch, where if the state signal is greater than the threshold, the switch unit is turned on; and a resistor unit connected to the switch unit and corresponding to the position switch numbered N, where the resistor unit has a resistance of $R*Z^{m+N}$, and is configured to: after the switch unit is turned on, convert, according to the preset rule, the state signal greater than the threshold into the first current signal with nonzero current value corresponding to the state signal greater than the threshold, where R is an arbitrary real number, Z is a natural number greater than 1, and M and N are natural numbers.

Preferably, the switch unit includes:

a MOSFET solid state switch, where a gate of the MOSFET is connected to a data line of the position switch numbered N;

a drain of the MOSFET is connected to the resistor unit;

a source of the MOSFET is grounded; and the gate is configured to receive the state signal of the position switch, and if the state signal is greater than the threshold, the source is conductive to the drain.

Preferably, the resistor unit includes:

a resistor with a resistance of $R*Z^{m+N}$, which is connected to the drain of the MOSFET and corresponds to the position switch numbered N, where R is an arbitrary real number, Z is a natural number greater than 1, M and N are natural numbers; and if the switch unit is turned on, the state signal greater than the threshold is converted, according a power source and the preset rule, into the first current signal with nonzero current value which corresponds to the state signal greater than the threshold.

Preferably, the second conversion device includes:

a current-to-voltage conversion unit with one end connected to an anode of a power source and the other end connected to the cable, where the current-to-voltage conversion unit is configured to receive the second current signal and convert the second current signal into an analog voltage signal; and an analog-to-digital conversion unit, connected to the current-to-voltage conversion unit, and configured to convert the analog voltage signal into the digital voltage signal.

Preferably, the control unit includes:

a first calculation unit configured to receive the digital voltage signal, and sum the digital state signals for respective position switches; and a second calculation unit configured to convert the sum of the digital state signals into a binary value, and restore the digital state signals for respective position switches according to bits of the binary value.

Preferably, Z in the $R*Z^{M+N}$ is 2.

Preferably, the second conversion device includes:

a current sensor and an analog-to-digital converter, an end of the current sensor is connected to the anode of the power source, and the other end of the current sensor is connected to the cable;

the input end of the current sensor receives the second current signal, and the output end of the current sensor outputs the analog voltage signal.

Preferably, the system further includes:

an operational amplifier, where the non-inverting input end of the operational amplifier is connected to the power source; and the inverting input end of the operational amplifier is connected to the cable.

The operational amplifier is configured to amplify the analog voltage signal and output the analog voltage signal through the output end.

The method for transmitting state signals of position switches includes:

receiving state signals for respective position switches;

converting, according to a preset rule, state signals greater than a threshold into first current signals with nonzero current value which have one-to-one correspondence to the state signals greater than the threshold;

using a sum for currents of the first current signals as a second current signal;

converting the second current signal into a digital voltage signal; and restoring the digital state signals for respective position switches from the digital voltage signal.

The disclosure has following beneficial effects.

A system for transmitting state signals of position switches is disclosed according to the disclosure. The system includes: a signal outputting unit, a first conversion device, a second conversion device and a control unit, where the signal outputting unit outputs state signals for respective position switches, the first conversion device converts the parallel state signals into parallel first current signals, after summing respective currents for the first current signals, the first current signals are combined into a serial second current signal, which is directly transmitted through a cable, and digital state signals for respective position switches are restored through the second conversion device and the control unit.

According to the disclosure, the parallel state signals output by respective position switches are converted into the parallel first current signals, the parallel first current signals are summed to acquire the serial second current signal, and after the second current signal is transmitted through the cable to the main control module, the digital state signals for respective position switches are restored. According to the disclosure, the state signals of position switches are transmitted between the main control module and the function module without using a form of a sequential circuit, thus affection from the sequential circuit does not exist, and the system has strong anti-interference ability, so that the main control module is capable of quickly and accurately acquiring the state signals for respective position switches; the second current signal is transmitted through cables, and according to the disclosure, the transmission may be implemented through a minimum of one cable, thus the cable bundle between the main control module and the function module may have a minimum diameter.

BRIEF DESCRIPTION OF THE DRAWINGS

To describe the technical solutions for the embodiment of the present disclosure or technical solution in conventional technology more clearly, the following briefly describes the drawings involved in the embodiments of the present disclosure or in the conventional technology. Apparently, the drawings described below are some embodiments, and persons of ordinary skill in the art can derive other drawings according to the drawings without any creative effort.

DETAILED DESCRIPTION

Technical solutions of the embodiments of the present disclosure will be illustrated completely and clearly with the following drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

Figure 4:
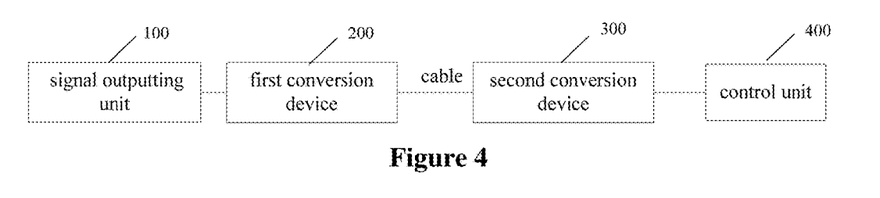
FIG. 4 is a schematic structural diagram of a system for transmitting state signals of position switches disclosed according to an embodiment of the disclosure.

The disclosure discloses a system for transmitting state signals of position switches. As shown in FIG. 4, the system includes following units and devices.

A signal outputting unit 100 is configured to output state signals for respective position switches.

Inside a function module, the signal outputting unit may output the state signals for respective position switches at the same time after receiving a command from a control unit, or the signal outputting unit itself transmits the state signals at regular intervals.

The state signals for the position switches have two states. In a case that a light path between a light-emitting end A and a light-sensitive end B is not obstructed, i.e., an object under detection is not in a predetermined position, the light-sensitive end B outputs a low-level voltage; and in a case that the light path between the light-emitting end A and the light-sensitive end B is obstructed, i.e., the object under detection is in the predetermined position, the light-sensitive end B outputs a high-level voltage.

The position switch is configured to detect whether the object under detection is in position. In practical implementation, when the voltage output by the light-sensitive end B is greater than a threshold, it is regarded that the state signal is the high-level voltage, and when the voltage output by the light-sensitive end B is smaller than the threshold, it is regarded that the state signal is the low-level voltage. The threshold may be determined as needed and is not limited herein.

A first conversion device 200 is connected to the signal outputting unit, and is configured to convert, according to a preset rule, state signals greater than the threshold into first current signals with nonzero current value which have one-to-one correspondence to the state signals greater than the threshold, and output the first current signals and a second current signal acquired by summing the first current signals.

Figure 5:
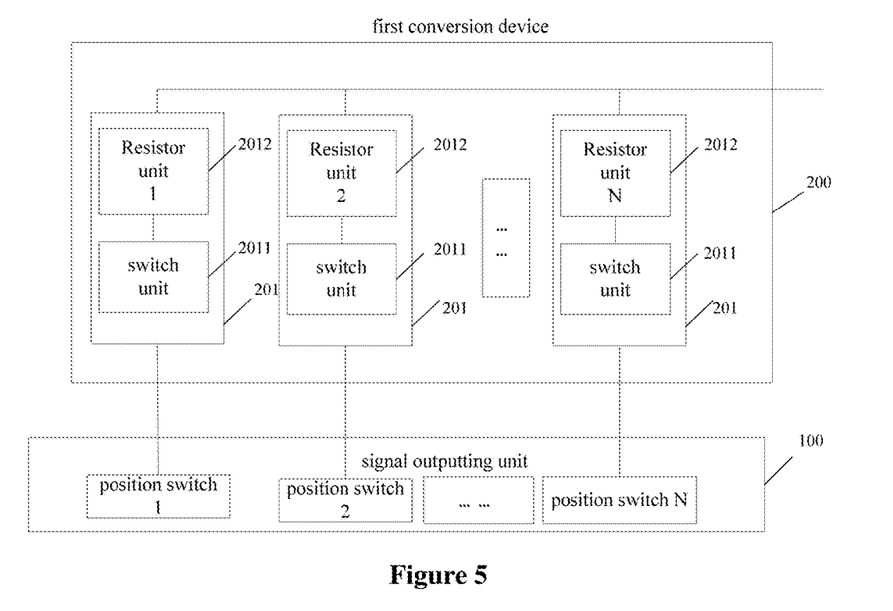
FIG. 5 is a schematic structural diagram of a first conversion device in a system for transmitting state signals of position switches disclosed according to an embodiment of the disclosure.

Inside the function module, as shown in FIG. 5, the first conversion device 200 includes conversion units 201 connected in parallel, each being connected to a position switch numbered N, where N is a natural number, N=1, 2, 3, . . . n, and n is number of the position switches; and the conversion unit 201 includes a switch unit 2011 and a resistor unit 2012.

The switch unit 2011 is connected to the position switch numbered N, and is configured to receive and detect the state signal of the position switch, if the state signal is greater than the threshold, the switch unit 2011 is turned on, and if the state signal is smaller than the threshold, the switch unit 2011 is turned off.

The resistor unit 2012, which is connected to the switch unit and corresponds to the position switch numbered N, has a resistance of $R*Z^{m+N}$, and is configured to: convert, according to the preset rule, the state signal greater than the threshold into the first current signal with nonzero current value which corresponds to the state signals greater than the threshold, in a case that the switch unit is turned on, where R is an arbitrary real number, Z is a natural number greater than 1, and M and N are natural numbers.

With respect to the number N for the position switch, the position switches are artificially numbered with ascending or descending natural numbers according to an order of the position switches to number each position switch as N, where N is a natural number.

As shown in FIG. 5, since the conversion units are connected in parallel, it can be known from the circuit theory that, voltages across respective conversion units are same. After the position switches transmit the state signals, the switch units detect the state signals; in case of state signals greater than the threshold, the switch units are turned on, and the resistor units with different resistances convert, under the same voltage, the state signals into the first current signals with nonzero current values which have one-to-one correspondence to the state signals; and in case of state signals smaller than the threshold, the switch units are not turned on, the circuit is disconnected, thus currents acquired through the conversion are zero.

In a case that the switch units are turned on, since resistances of the resistor units vary exponentially, for example, a resistance of a resistor unit numbered 1 is $R*Z^{m+1}$, a resistance of a resistor unit numbered 2 is $R*Z^{m+2}$, a resistance of a resistor unit numbered 3 is $R*Z^{m+3}$, the power exponent of Z gradually increases in an ascending order of number N of the position switch until the last resistor unit, and by that analogy, a resistance of a resistor unit numbered N is $R*Z^{m+N}$, the currents through the turned-on conversion units are different for the conversion units are connected to each other in parallel, the voltages across the circuits are the same, and the resistor units have different resistances.

The currents through respective conductive conversion units gradually decrease in an ascending order of the resistances of the resistor units. At the convergence of parallel branches for the conversion units, currents through respective branches are automatically summed, i.e., currents through respective conversion units with zero-valued current or non-zero-valued current are summed, and the sum of the currents in the respective conversion units is used as the second current signal and is transmitted through a cable.

Figure 6:
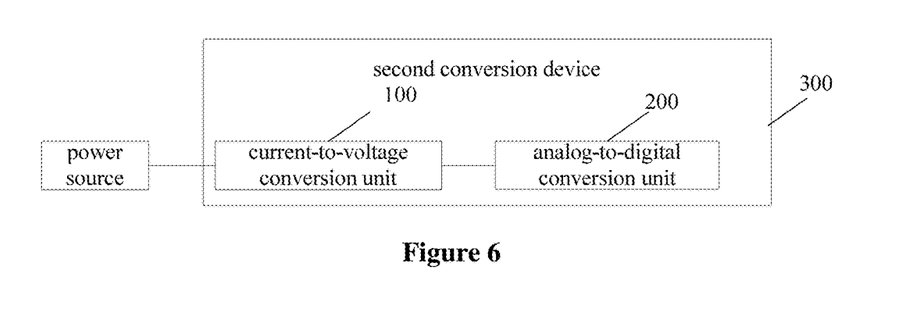
FIG. 6 is a schematic structural diagram of a second conversion device in a system for transmitting state signals of position switches disclosed according to an embodiment of the disclosure.

A second conversion device 300 is configured to receive the second current signal through the cable, and convert the second current signal into a digital voltage signal. As shown in FIG. 6, the second conversion device 300 includes: a current-to-voltage conversion unit 301 and an analog-to-digital conversion unit 302.

The current-to-voltage conversion unit 301, with one end connected to an anode of a power source and the other end connected to the cable, is configured to receive the second current signal and convert the second current signal into an analog voltage signal.

The analog-to-digital conversion unit 302 is connected to the current-to-voltage conversion unit, and is configured to convert the analog voltage signal into the digital voltage signal.

After the first conversion device 200 of the function module converts the state signals into the second current signal and transmits the second current signal to a main control module through the cable, inside the main control module, the current-to-voltage conversion unit 301 receives the second current signal and converts the second current signal into the analog voltage signal, and the analog voltage signal is converted into the digital voltage signal through the analog-to-digital conversion unit 302.

Figure 7:
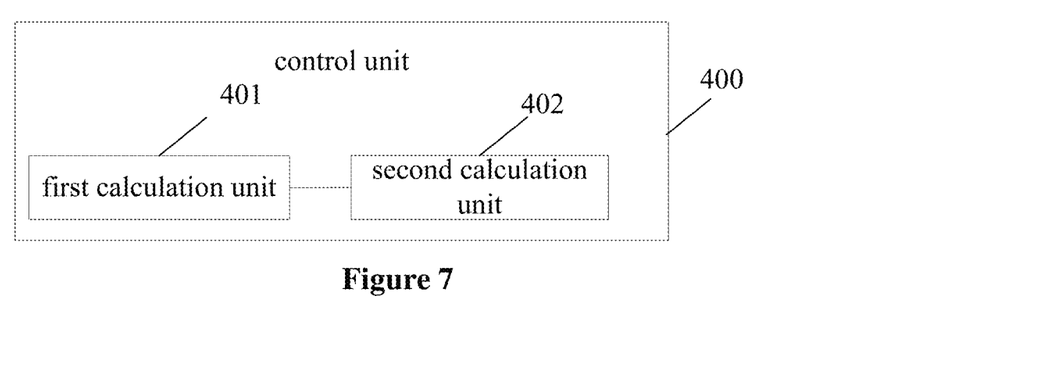
FIG. 7 is a schematic structural diagram of a control unit in a system for transmitting state signals of position switches disclosed according to an embodiment of the disclosure.

A control unit 400 is configured to receive the digital voltage signal, and restore the digital state signals for respective position switches. As shown in FIG. 7, the control unit 400 includes a first calculation unit 401 and a second calculation unit 402.

The first calculation unit 401 is configured to receive the digital voltage signal, and figure out the sum of the digital state signals for respective position switches.

The second calculation unit 402 is configured to convert the sum of the digital state signals into a binary value, and restore the digital state signals for respective position switches according to bits of the binary value.

According to the disclosure, in the function module end, the parallel state signals output by respective position switches are converted into parallel first current signals, the parallel first current signals are summed to acquire the serial second current signal which is transmitted through the cable; and in the main control module end, the digital state signals for respective position switches are restored through the second conversion device and the control unit. A way of using a sequential circuit is avoided, thus affection from the sequential circuit does not exist, and the system has strong anti-interference ability, so that the main control module is capable of quickly and accurately acquiring the state signals for respective position switches; the second current signal is transmitted through a minimum of one cable, thus a cable bundle between the main control module and the function module may have a minimum diameter.

Figure 8:
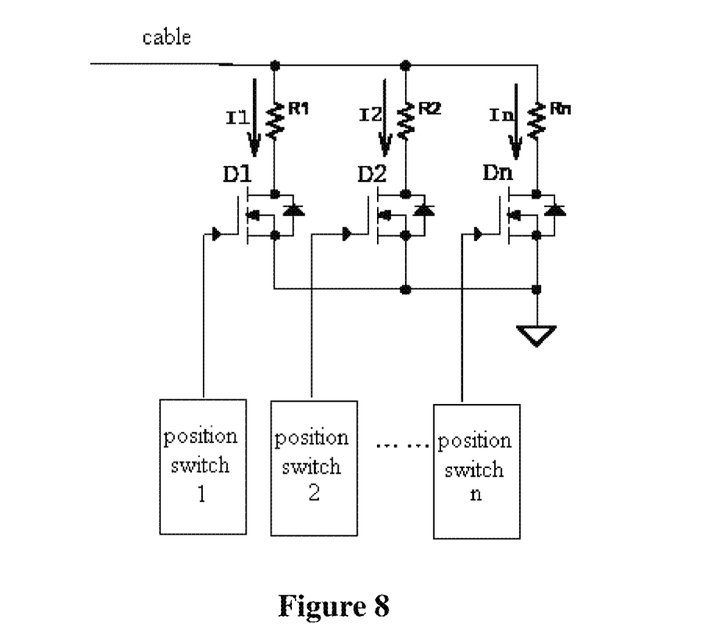
FIG. 8 is a schematic circuit diagram of a first conversion device in a system for transmitting state signals of position switches disclosed according to an embodiment of the disclosure.

As shown in FIG. 8, the switch unit 2011 includes:
a metal-oxide-semiconductor field-effect transistor (MOSFET, shorted as solid state switch).

A gate of the MOSFET is connected to a data line of the position switch numbered N.

A drain of the MOSFET is connected to the resistor unit.

A source of the MOSFET is connected to ground.

The gate is configured to receive the state signal of the position switch, and if the state signal is greater than the threshold, the source is conductive to the drain.

The gate of the MOSFET is connected to the data line numbered N, and receives the state signal output by the position switch through the data line. In a case that the state signal is greater than the on-threshold of the MOSFET, the source is conductive to the drain, thus the MOSFET is turned on, and sources of all MOSFETs are jointly grounded. Therefore in this disclosure, the threshold is the on-threshold of the MOSFET, so that the MOSFET recognizes whether the position switch outputs a high level voltage or a low level voltage. It should be noted that, the low level voltage is significantly smaller than the on-threshold of the MOSFET, and thus may not turn the MOSFET on.

As shown in FIG. 8, the resistor unit 2012 includes:
a resistor with a resistance of $R*Z^{m+N}$, which is connected to the drain of the MOSFET and corresponds to the position switch numbered N, where R is an arbitrary real number, Z is a natural number greater than 1, M and N are natural numbers.

If the switch unit is turned on, the state signal greater than the threshold is converted in the preset rule, according to the power source, into the first current signal with nonzero current value which corresponds to the state signal greater than the threshold.

The resistor unit numbered RN is connected to the position switch N. It is configured that the resistance of each resistor unit is $R*Z^{m+N}$, and N is numbering of the position switch. Since each position switch has an unique number, the resistor units have different resistances; and after being turned on, each switch unit has an extremely small resistance which approximately equals to zero, therefore an end of the resistor unit which is connected to the switch unit may be regarded as approximately directly connected to the ground, and the other ends for all resistor units are jointly connected to the cable, thus all resistor units are connected to each other in parallel, and the voltages across the resistor units are the same. After the switch units are turned on, currents through the resistor units connected to the turned-on switch units are different, and currents through the resistor unit connected to non-turned-on switch units are approximately zero.

Figure 9:
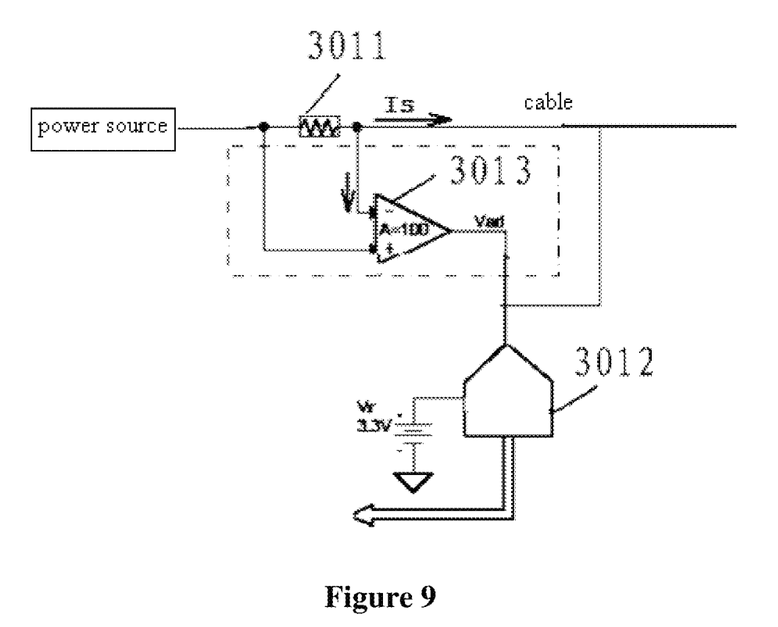
FIG. 9 is a schematic circuit diagram of a second conversion device in a system for transmitting state signals of position switches disclosed according to an embodiment of the disclosure.

As shown in FIG. 9, the current-to-voltage conversion unit 301 includes:

a current sensor 3011 with one end connected to the anode of the power source, and the other end connected to the cable, where the input end of the current sensor receives the second current signal, and the output end of the current sensor outputs the analog voltage signal.

The current-to-voltage conversion unit includes a current sensor, a resistor and an operational amplifier, etc., as long as the current-to-voltage conversion unit is capable of converting the second current signal into a voltage signal, and is not limited herein.

The analog-to-digital conversion unit 3012 includes:

an A/D converter, where an input end of the A/D converter is connected to the current sensor and is configured to receive the analog voltage signal, and an output end of the A/D converter outputs the digital voltage signal.

The A/D converter is configured to convert the analog voltage signal output by the current-to-voltage conversion unit into the digital voltage signal.

As shown in the dashed box of FIG. 9, the system further includes: an operational amplifier 3013, where a non-inverting input end of the operational amplifier is connected to the power source; and an inverting end of the operational amplifier is connected to the cable.

The operational amplifier is configured to amplify the analog voltage signal and output the analog voltage signal through the output end.

The non-inverting end of the operational amplifier is connected to the power source, the inverting end of the operational amplifier is connected to the current sensor, magnification of the operational amplifier A is equal to 100, and the amplified analog voltage signal is output through the output end. Since the current sensor outputs an extremely small voltage signal, to satisfy requirement of the A/D converter, the operational amplifier is used to amplify the voltage signal.

In case that the operational amplifier is added, the analog-to-digital converter includes:

an A/D converter, where the input end of the A/D converter is connected to the output end of the operational amplifier, and is configured to receive the analog voltage signal.

The input end of the A/D converter receives the voltage output by the operational amplifier, the analog voltage signal is output through the output end of the A/D converter, and a voltage of 3.3V is applied to a reference voltage input end of the A/D converter, so that the analog voltage signal is converted into the digital voltage signal.

In the above of the disclosure, only a process for transmitting state signals of position switches from a function module to a main control module is described. Digital signals of other types may also be transmitted between the function module and the main control module according to the disclosure. At the digital signal transmitting end, digital signals are output by the signal outputting unit, parallel digital signals are converted into parallel first current signals through the first conversion device, a second current signal is acquired through summing the currents of the first current signals, and the second current signal is transmitted to the digital signal receiving end through the cable; and at the digital signal receiving end, respective values of the digital signals are restored through the second conversion device and the control unit. The second current signal may be transmitted through a minimum of one cable, thus the cable bundle between the digital signal transmitting end and the digital signal receiving end may have a minimum diameter.

The disclosure is described theoretically in the foregoing, and a specific application scenario of the disclosure is described in the following.

Figure 10:
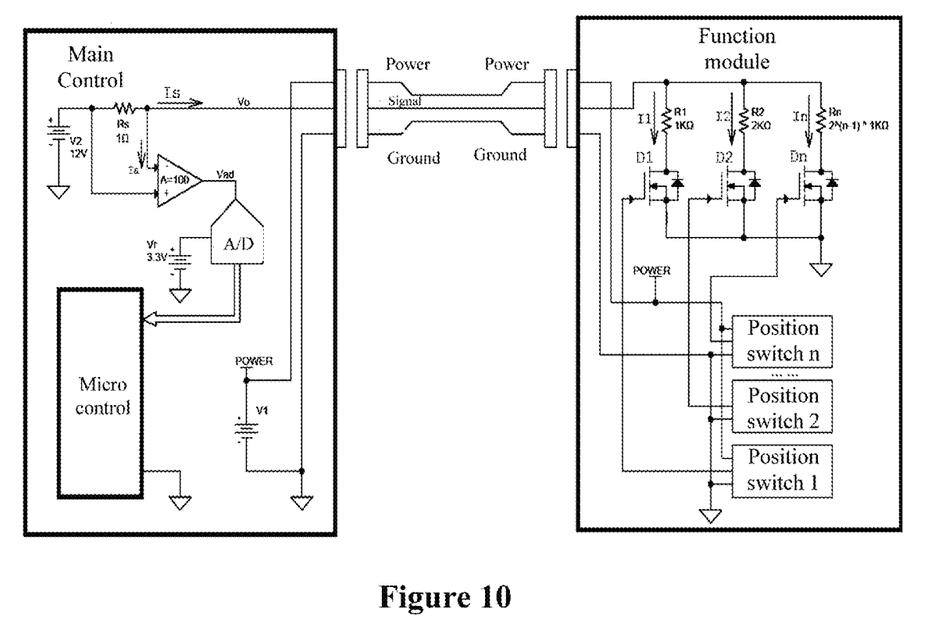
FIG. 10 is a schematic circuit diagram of a system for transmitting state signals of position switches disclosed according to an embodiment of the disclosure.

FIG. 10 shows an embodiment of a specific application scenario according to the disclosure. The embodiment is as follows.

It is assumed that respective position switches are numbered 1, 2 . . . N, MOSFETs connected to the position switches one to one are numbered D1, D2 . . . DN, and resistor units connected to the MOSFETs one to one are numbered R1, R2 . . . RN. It can be known from the foregoing that $RN=R*Z^{M+N}$.

In this embodiment, it is assumed that R=Rz=1 KΩ, Z=2, M=0, $$RN=Rz*2^N \qquad \text{formula (1)},$$

where N is a natural number.

Proportion among the resistances is R1: R2 . . . RN= 2:4 . . . 2N, where $R1=Rz*2^1$, $R2=Rz*2^2$ . . . $RN=Rz*2^N$.

According to the embodiment, for MOSFETs numbered D1, D2 . . . DN, on-resistances are Ron_1, Ron_2 . . . Ron_N respectively, and off-resistances are Roff_1, Roff_2, . . . Roff_N respectively.

When the position switch output a high level voltage, the MOSFET is turned on. In can be known from the drawing that a circuit in which all conversion units are connected in parallel is connected to the resistance Rs in series. In specific implementation, Rs has extremely small resistance, 1Ω in this embodiment. Therefore value of the power source V2 is used as the voltage across the conversion units connected in parallel, so that a current IN_on through a conversion unit is equal to V2/(RN+Ron_N). In specific implementation, the on-resistance Ron_N of the MOSFET is greatly smaller than the minimum one of R1 to RN, thus affection of Ron_N on IN_on is neglected, i.e, $$IN\_on=V2/RN \qquad \text{formula (2)}.$$

In a case that the position switch output a low level voltage, the MOSFET is turned off, so that IN_off=V2/(RN+ Roff_N). In specific implementation, the off-resistance Roff_N of the MOSFET is much greater than the maximum one of R0 to Rn, thus the current through the off-state MOSFET is neglected, i.e., $$IN\_off=0 \qquad \text{formular (3)}.$$

In this embodiment, KN is used to represent a state of the position switch, in a case that KN is equal to 1, it is indicated that the position switch outputs the high level voltage; and in a case that KN is equal to 0, it is indicated that the position switch outputs the low level voltage.

The following relationship may be acquired through formula (1), formula (2) and formula (3):

$$IN = KN * \frac{V2}{RN} = \frac{V2}{Rz} * KN * 2^{-N},  \quad \text{formula (4)}$$

then total current IS:

$$IS = I1 + I2 + \ldots + IN \quad \text{formula (5),}$$

and formula (4) and formula (5) are combined to acquire $$IS = \frac{V2}{Rz} * (K1*2^{-1} + K2*2^{-2} + k3*2^{-3} + \ldots + KN*2^{-N}) \quad \text{formula (6)}$$

At the main control module end, a current sampling resistance Rs is used to convert the current IS into an analog voltage signal VS, VS=(IS+Ia)* Rs, where Ia is a current input to the inverting input end of the operational amplifier, which is extremely small, thus may be neglected in specific implementation, so that $$VS = IS * Rs \quad \text{formula (7)}$$

It is assumed that the operational amplifier has a magnification of A, so that the voltage across the analog-to-digital converter is $$Vad = A * VS \quad \text{formula (8).}$$

Formula (6), formula (7) and formula (8) are combined to acquire:

$$Vad = A * Rs * \frac{V2}{Rz} * \quad \text{formula (9)}$$
$$(K1*2^{-1} + K2*2^{-2} + k3*2^{-3} + \ldots + KN*2^{-N}).$$

It is assumed that a reference voltage of the analog-to-digital converter is Vr. In a case that all position switches output high level voltages, i.e., KN=1, $$Vr = A * Rs * \frac{V2}{Rz} * (2^{-1} + 2^{-2} + 2^{-3} + \ldots + 2^{-N}). \quad \text{formula (10)}$$

The binary data output by the analog-to-digital converter includes Q bits where Q=N+1, the A/D converter outputs data:

$$D = \frac{Vad}{Vr} * (2^Q - 1) \quad \text{formula (11)}$$

Formula (9) and formula (11) are combined to acquire $$D = A * Rs * \frac{V2}{Rz * Vr} * (2^Q - 1) * \quad \text{formula (12)}$$
$$(1 + K1*2^{-1} + K2*2^{-2} + k3*2^{-3} + \ldots + KN*2^{-N})$$

A conversion coefficient is preset:

$$W = A * Rs * \frac{V2}{Rz * Vr} * (2^Q - 1). \quad \text{formula (13)}$$

Formula (13) and formula (14) are combined to acquire $$D = W * (K1*2^{-1} + K2*2^{-2} + k3*2^{-3} + \ldots + KN*2^{-N}) \quad \text{formula (14)}$$

A microcontroller of the main control module reads a voltage output by the A/D converter, and states K1 to KN for the position switches are calculated through following methods.

Value P is calculated:

$$P = 2^n * \frac{D}{W}. \quad \text{formula (15)}$$

Formula (14) and formula (15) are combined to acquire $$P = K0*2^N + K1*2^{N-1} + K2*2^{N-2} + k3*2^{N-3} + \ldots + KN*2^0 \quad \text{formula (16)}$$

It is known that number of the position switches are N, P is converted into a binary number with N+1 bits, so that the state of the position switch is that $$KN = P(N+1-n) \ (n=1, 2, 3 \ldots N) \quad \text{formula (17)}$$

Therefore, through only one A/D conversion and adequate calculation, the main control module may acquire states for N+1 position switches at the same time.

Affection of systematic error is not considered in formula (17) according to above embodiment. In a case that the systematic error is considered, the following method is added on the basis of the above embodiment.

First step includes: predetermining, according to the number of position switches and required system precision, Q value of the analog-to-digital converter and range of data value P of the analog-to-digital converter.

Taking the case that the number N of the position switches are 3 as an example, the required system precision is not high, it is assumed that Q=N+2, thus in this embodiment, Q=5. Range of P may be acquired according to switching states for respective position switches.

If the switching states of the three position switches are 000, value of P is 000XX, thus value of P ranges from 0-3, XX represents two bits of binary value, and thus XX ranges from 0-3. Similarly, value range of P may be acquired in a case that the three position switches are in another switching state, as shown in FIG. 9

Other steps are the same with those according to the foregoing embodiment. In formula (11), the number Q of bits for the binary data output by the analog-to-digital converter is increased to a value two or more greater than the number N of position switches, and the greater the value of Q is, the smaller the systematic error is; and the value of Q may be determined according to specific condition, and is not limited herein. Second step includes: determining the states for respective position switches according to the range of P.

After formula (16) is acquired, a pre-analysis step is added, the range of P is calculated according to the value of P, and the state signals for respective position switches are acquired according to the range of P.

Figure 11:
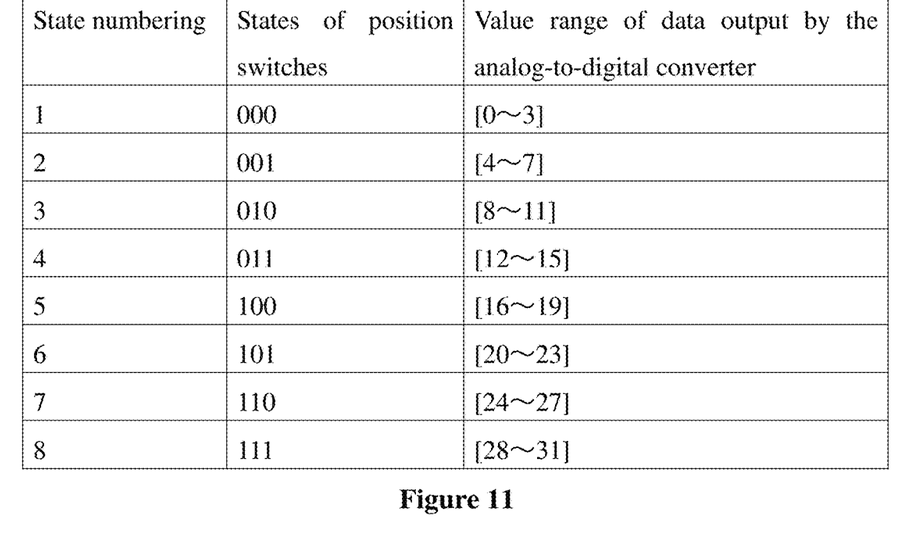
FIG. 11 is a schematic diagram of a correspondence between states of position switches and data output by an A/D converter in a system for transmitting state signals of position switches.

States for N position switches are determined according to pre-calculated value range. For example, the value acquired through analog-to-digital conversion is 21, and value P which is equal to 21 is included in numerical range 20-23 in row 6 in FIG. 11, thus the states for the three position switches are represented as 101, and the states for respective position switches are 1, 0, 1 in turn.

A system for transmitting state signals of position switches is disclosed according to the disclosure. The system includes: a signal outputting unit, a first conversion device, a second conversion device and a control unit, where the signal outputting unit outputs state signals for respective position switches, the first conversion device converts the parallel state signals into parallel first current signals, after summing respective currents of the first current signals, the first current signals are combined into a serial second current signal, which is directly transmitted through a cable, and digital state signals for respective position switches are restored through the second conversion device and the control unit.

According to the disclosure, the parallel state signals for respective position switches are converted to the parallel first current signals and the second current signal is acquired by summing the first current signals. A way of using sequential circuit is avoided in the system, thus affection from the sequential circuit does not exist, and the system has strong anti-interference ability, so that the main control module is capable of quickly and accurately acquiring the state signals for respective position switches; the second current signal is transmitted through cables, and it is well known that the transmission may be implemented through a minimum of one cable, thus the cable bundle between the main control module and the function module may have a minimum diameter.

Figure 12:
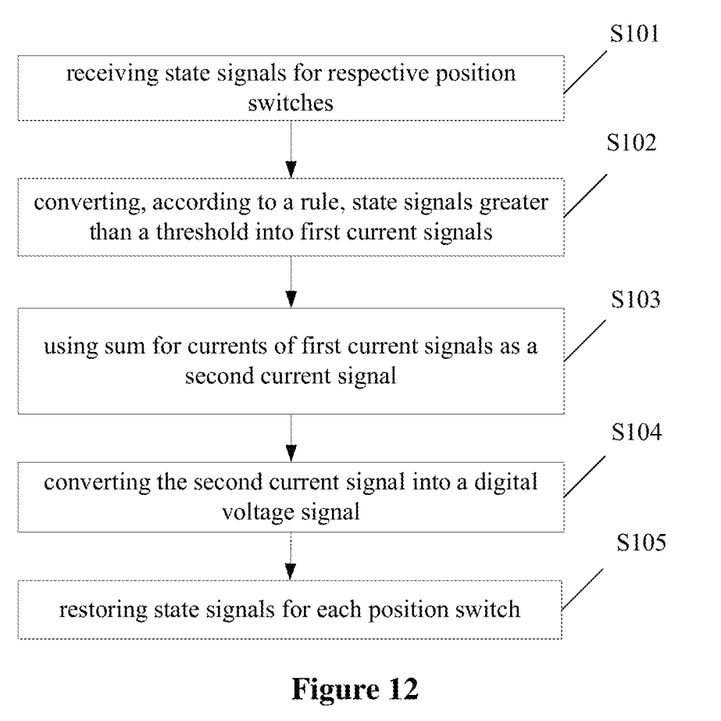
FIG. 12 is a flow chart of a method for transmitting state signals of position switches disclosed according to an embodiment of the disclosure.

As shown in FIG. 12, a method for transmitting state signals of position switches is also provided according to the disclosure. The method includes following steps.

Step S101 includes: receiving state signals for respective position switches.

Step S102 includes: converting, according to a rule, a threshold into first current signals, i.e., converting, according to the preset rule, the state signals greater than the threshold into the first current signals with nonzero current value which have one-to-one correspondence to the state signals greater than the threshold.

Step S103 includes: using a sum for currents of respective first current signals as a second current signal.

Step S104 includes: converting the second current signal into a digital voltage signal.

Step S105 includes: restoring state signals for respective position switches, i.e., restoring the state signals for respective position switches from the digital voltage signal.

If the functions described in the method according to the embodiment are implemented in the form of software function unit and the software function unit is sold or used as separate products, the software function unit may also be stored in a computer readable storage medium. Based on such understanding, the technical solutions of the disclosure, part of the disclosure that contributes to existing technologies or part of the technical solutions may be embodied in the form of a computer software product. The computer software product is stored in a storage medium and includes several instructions for instructing a computer device (which may be personal computer, server, network device or the like) to implement all of or part of the steps of the methods according to the embodiments of the disclosure. The foregoing storage medium includes various media that can store program codes, for example, USB disk, mobile hard disk drive, Read-Only Memory (ROM), Random Access Memory (RAM), magnetic disk, optical disk and the like.

The embodiments of the disclosure are described in a progressive way, each of which emphasizes the differences from others, and the same or similar elements among the embodiments can be referred to each other.

According to the description of the disclosed embodiments, the disclosure may be implemented or used by the person skilled in the art. Various modifications made to these embodiments are apparent for persons skilled in the art, and a normal principle defined in the disclosure may be implemented in other embodiments without departing from spirit or scope of the disclosure. Therefore the disclosure is not limited to the embodiments described in the disclosure but confirms to a widest scope in accordance with principles and novel features disclosed in the disclosure.

The invention claimed is:

1. A system for transmitting state signals of position switches, comprising:
   a signal outputting unit configured to output state signals for respective position switches;
   a first conversion device connected to the signal outputting unit, wherein the first conversion device is configured to convert, according to a preset rule, state signals greater than a threshold into first current signals with nonzero current value which have one-to-one correspondence to the state signals greater than the threshold, and output a second current signal acquired by summing currents of the first current signals;
   a second conversion device configured to receive the second current signal through a cable, and convert the second current signal into a digital voltage signal; and
   a control unit configured to receive the digital voltage signal, and restore the digital state signals for respective position switches;
   wherein the first conversion device comprises:
   conversion units connected in parallel, the conversion units being connected in one-to-one manner to the position switches numbered N, wherein N is a natural number, N=1, 2, 3, . . . n, n is a quantity of the position switches, and
   the conversion unit comprises:
   a switch unit connected to the position switch numbered N, wherein the switch unit is configured to receive and detect the state signal of the position switch, and if the state signal is greater than the threshold, the switch unit is turned on; and
   a resistor unit connected to the switch unit and corresponding to the position switch numbered N, wherein the resistor unit has a resistance of $R*Z^{M+N}$, and is configured to: after the switch unit is turned on, convert, according to the preset rule, the state signal greater than the threshold into the first current signal with nonzero current value corresponding to the state signal greater than the threshold, wherein R is an arbitrary real number, Z is a natural number greater than 1, and M and N are natural numbers.

2. The system according to claim 1, wherein the switch unit comprises:
   a MOSFET solid state switch, wherein:
   a gate of the MOSFET is connected to a data line of the position switch numbered N;
   a drain of the MOSFET is connected to the resistor unit; and
   a source of the MOSFET is grounded, wherein
   the gate is configured to receive the state signal of the position switch, and if the state signal is greater than the threshold, the source is conductive to the drain.

3. The system according to claim 2, wherein the resistor unit comprises:
   a resistor with a resistance of $R*Z^{M+N}$, which is connected to the drain of the MOSFET and corresponds to the position switch numbered N, wherein R is an arbitrary real number, Z is a natural number greater than 1, M and N are natural numbers; and according to a power source, the resistor unit converts, with the preset rule, the state signal greater than the threshold into the first current signal with nonzero current value which corresponds to the state signal greater than the threshold, if the switch unit is turned on.

4. The system according to claim 1, wherein the second conversion device comprises:
a current-to-voltage conversion unit with one end connected to an anode of a power source and the other end connected to a cable, wherein the current-to-voltage conversion unit is configured to receive the second current signal and convert the second current signal into an analog voltage signal; and
an analog-to-digital conversion unit connected to the current-to-voltage conversion unit, wherein the analog-to-digital conversion unit is configured to convert the analog voltage signal into the digital voltage signal.

5. The system according to claim 1, wherein the control unit comprises:
a first calculation unit configured to receive the digital voltage signal, and sum the digital state signals for respective position switches; and
a second calculation unit configured to convert the sum of the digital state signals into a binary value, and restore the digital state signals for respective position switches according to bits of the binary value.

6. The system according to claim 1, wherein Z in $R*Z^{M+N}$ is 2.

7. The system according to claim 4, wherein the second conversion device comprises:
a current sensor and an analog-to-digital converter, wherein:
an end of the current sensor is connected to the anode of the power source, and the other end of the current sensor is connected to the cable;
the input end of the current sensor receives the second current signal; and
the output end of the current sensor outputs the analog voltage signal.

8. The system according to claim 4, wherein the second conversion device further comprises:
an operational amplifier, wherein:
an non-inverting input end of the operational amplifier is connected to the power source;
an inverting input end of the operational amplifier is connected to the cable; and
the operational amplifier is configured to amplify the analog voltage signal and output the analog voltage signal through an output end.

9. A method for transmitting state signals of position switches, comprising:
receiving state signals for respective position switches;
converting, by a first conversion device, according to a preset rule, state signals greater than a threshold into first current signals with nonzero current value which have one-to-one correspondence to the state signals greater than the threshold;
summing by a first conversion device, currents of the first current signals as a second current signal;
converting, by a second conversion device, the second current signal into a digital voltage signal; and
restoring, a control unit, the digital state signals for respective position switches from the digital voltage signal;
wherein the first conversion device comprises:
conversion units connected in parallel, the conversion units being connected in one-to-one manner to the position switches numbered N, wherein N is a natural number, N=1, 2, 3, . . . n, n is a quantity of the position switches, and
the conversion unit comprises:
a switch unit connected to the position switch numbered N, wherein the switch unit is configured to receive and detect the state signal of the position switch, and if the state signal is greater than the threshold, the switch unit is turned on; and
a resistor unit connected to the switch unit and corresponding to the position switch numbered N, wherein the resistor unit has a resistance of $R*Z^{M+N}$, and is configured to: after the switch unit is turned on, convert, according to the preset rule, the state signal greater than the threshold into the first current signal with nonzero current value corresponding to the state signal greater than the threshold, wherein R is an arbitrary real number, Z is a natural number greater than 1, and M and N are natural numbers.

10. The system according to claim 3, wherein Z in $R*Z^{M+N}$ is 2.

11. The system according to claim 7, wherein the second conversion device further comprises:
an operational amplifier, wherein:
an non-inverting input end of the operational amplifier is connected to the power source;
an inverting input end of the operational amplifier is connected to the cable; and
the operational amplifier is configured to amplify the analog voltage signal and output the analog voltage signal through an output end.

* * * * *

UNITED STATES PATENT AND TRADEMARK OFFICE
CERTIFICATE OF CORRECTION

PATENT NO. : 9,891,606 B2
APPLICATION NO. : 14/767660
DATED : February 13, 2018
INVENTOR(S) : Ping Gao Page 1 of 1

It is certified that error appears in the above-identified patent and that said Letters Patent is hereby corrected as shown below:

In the Specification

At Column 3, Line 46, delete "$R*Z^{m+N}$" and replace it with -- $R*Z^{M+N}$ --.

At Column 3, Line 63, delete "$R*Z^{m+N}$" and replace it with -- $R*Z^{M+N}$ --.

At Column 7, Line 3, delete "$R*Z^{m+N}$" and replace it with -- $R*Z^{M+N}$ --.

At Column 7, Line 31, delete "$R*Z^{m+1}$" and replace it with -- $R*Z^{M+1}$ --.

At Column 7, Line 32, delete "$R*Z^{m+2}$" and replace it with -- $R*Z^{M+2}$ --.

At Column 7, Line 33, delete "$R*Z^{m+3}$" and replace it with -- $R*Z^{M+3}$ --.

At Column 7, Line 36, delete "$R*Z^{m+N}$" and replace it with -- $R*Z^{M+N}$ --.

At Column 8, Line 58, delete "$R*Z^{m+N}$" and replace it with -- $R*Z^{M+N}$ --.

At Column 9, Line 3, delete "$R*Z^{m+N}$" and replace it with -- $R*Z^{M+N}$ --.

Signed and Sealed this
Twenty-fourth Day of July, 2018

Andrei Iancu
*Director of the United States Patent and Trademark Office*